United States Patent
Hirano et al.

(10) Patent No.: US 6,871,055 B2
(45) Date of Patent: Mar. 22, 2005

(54) DIRECT CONVERSION RECEIVER, MOBILE RADIO EQUIPMENT USING THE SAME, AND RF SIGNAL RECEIVING METHOD

(75) Inventors: Shunsuke Hirano, Yokohama (JP); Yasunori Miyahara, Ayase (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 427 days.

(21) Appl. No.: 10/218,658

(22) Filed: Aug. 15, 2002

(65) Prior Publication Data

US 2003/0119461 A1 Jun. 26, 2003

(30) Foreign Application Priority Data

Dec. 26, 2001 (JP) ........................................ 2001-395035

(51) Int. Cl.[7] .................................................. H04B 1/10
(52) U.S. Cl. ........................ 455/310; 455/312; 455/324; 455/296; 455/307; 455/340
(58) Field of Search ................................ 455/324, 339, 455/343, 295, 296, 303–307, 310, 312, 340

(56) References Cited

U.S. PATENT DOCUMENTS

| | | | | |
|---|---|---|---|---|
| 5,392,456 A | * | 2/1995 | Mitomo et al. ........ | 340/825.21 |
| 5,422,889 A | * | 6/1995 | Sevenhans et al. ......... | 370/442 |
| 6,006,079 A | * | 12/1999 | Jaffee et al. ................ | 455/310 |
| 6,021,323 A | | 2/2000 | Vagher ....................... | 455/324 |
| 6,373,907 B1 | * | 4/2002 | Katsura et al. ............. | 375/345 |
| 6,459,889 B1 | * | 10/2002 | Ruelke ....................... | 455/296 |

* cited by examiner

Primary Examiner—Duc M. Nguyen
(74) Attorney, Agent, or Firm—Louis Woo

(57) ABSTRACT

In a direction conversion receiver, a quadrature demodulator produces differential signals in a baseband on the basis of a local signal of a frequency synthesizer, with the differential signals being inputted through a first low pass filter, a gain control amplifier and an amplifier to a control unit and a direct current component between the differential signals being extracted in a second low pass filter. In addition, an offset compensating section reduces an offset voltage while the control unit outputs a control signal for the control of the gain control amplifier. The second low pass filter includes a time constant circuit for determining a time constant through the use of resistors and a capacitor, and a time constant changing section. A time constant control unit controls the time constant changing section for a predetermined period of time after the control unit outputs data for the change of a frequency of the local signal so that the time constant of the time constant circuit decreases. This shortens the time needed for the settlement of automatic gain control and prevents the deterioration of demodulation accuracy during a call.

10 Claims, 6 Drawing Sheets

DIRECT CONVERSION RECEIVER, MOBILE RADIO EQUIPMENT USING THE SAME, AND RF SIGNAL RECEIVING METHOD

BACKGROUND OF THE INVENTION

1) Field of the Invention

The present invention relates to a direct conversion receiver for use in mobile radio equipment or the like, a mobile radio equipment using this direct conversion receiver, and a method of receiving an RF signal.

2) Description of the Related Art

FIG. 5 is a block diagram showing a circuit arrangement of a conventional typical direct conversion receiver. In this illustration, a quadrature demodulator 1 is made to receive, as one input, an RF (Radio Frequency) signal obtained by the quadrature modulation of carriers in phase and amplitude and to receive a local signal Lo as another input for outputting signals i, ix (i and ix denote a differential signal) and q, qx (q and qx signify a differential signal) pertaining to a baseband, which have quadrature relation to each other. A receive baseband unit 2 is connected to output terminals of the quadrature demodulator 1 for the baseband signals i and ix, and a receive baseband unit 3 is connected to output terminals thereof for the baseband signals q and qx. These receive baseband units 2 and 3 have the same arrangement, and a detailed description will be given of only the arrangement of the receive baseband unit 2 for the purpose of the simplicity of the illustration and explanation. The receive baseband unit 3 is illustrated as a single block.

The receive baseband unit 2 is made up of a low pass filter (LPF) 21 for deriving low-frequency components of the baseband signals i and ix, a gain control amplifier 22 for amplifying an output signal of the low-pass filter 21, an amplifier 25 for amplifying an output signal of the gain control amplifier 22 at a constant gain to output baseband signals I and Ix (I and Ix represent a differential signal), and an offset compensating circuit 20 for removing a DC offset occurring in the receive baseband unit 2. This offset compensating circuit 20 is composed of a low pass filter (LPF) 24 for receiving the baseband signals I and Ix outputted from the amplifier 25 to derive low-frequency components therefrom, and an offset compensating section 23 for receiving signals outputted from the low-pass filter 24, that is, signals corresponding to offset voltages, to convert them into voltages or currents for feedbacking the voltages or the currents to an input of the amplifier 25. Thus, the baseband signals I and Ix, subjected to the removal of the DC offset, are fed to a control unit 4.

In addition, DC offset removed baseband signals Q and Qx (Q and Qx depict a differential signal) are supplied from the receive baseband unit 3, having the same arrangement as that of the receive baseband unit 2, to the same control unit 4.

The control section 4 calculates a received signal level on the basis of the given baseband signals I, Ix and Q, Qx to apply a gain control signal Vgc to the gain control amplifier 22 forming a component of each of the receive base band units 2 and 3 and further to a clock signal (which will be referred to hereinafter as a "CLOCK"), a data signal (referred to hereinafter as a "DATA") and a strobe signal (referred to hereinafter as a "STROBE"). A frequency synthesizer 6 produces a local signal Lo from a reference signal of a reference signal source 5 on the basis of data set by the CLOCK, the DATA and the STROBE and supplies the local signal Lo to the quadrature demodulator 1. Since this frequency synthesizer 6 requires high stability and high signal purity, a PLL (Phase Locked Loop) is constructed with a voltage control oscillator 61 and a frequency control section 62.

Secondly, a description will be given hereinbelow of an operation of the conventional direct conversion receiver shown in FIG. 5.

In a case in which a direct conversion receiver is employed for a mobile radio equipment based on a W-CDMA (Wideband-Code Division Multiple Access) system, since there is a need to receive a transmitted signal linearly irrespective of the strength of the received signal, a receive baseband unit is required to have performances, such as a cascade gain of several tens dB and a gain control range of several tens dB.

Now, when an RF signal obtained by the quadrature modulation of the phases and amplitudes of carriers and an output signal Lo of a frequency synthesizer are inputted to the quadrature demodulator 1, the quadrature demodulator 1 outputs baseband signals i, ix and q, qx. Of these signals, the signals i and ix are inputted to the receive baseband unit 2 while the signals q and qx are put in the receive baseband unit 3. A description will be given of only the receive baseband unit 2, for that the receive baseband units 2 and 3 have the same arrangement.

At this time, the signals i and ix undergo the band restriction in the low pass filter 21 and are amplified in the gain control amplifier 22 and further amplified at a constant gain in the amplifier 25 to be inputted as signals I and Ix to the control unit 4. The control unit 4 calculates a received signal level on the basis of the signals I and Ix to output a gain control signal Vgc for controlling the gain of the gain control amplifier 22 so that the values of the signals I and Ix become constant.

Also in the receive baseband unit 3, as well as the receive baseband unit 2, the signals q and qx are amplified so that the constant-level signals Q and Qx are inputted to the control unit 4.

At this time, the control unit 4 sets and outputs a CLOCK, a DATA and a STROBE, and the frequency synthesizer 6 produces a local signal Lo from an output signal of the reference signal source 5 on the basis of these set data, and sends it to the quadrature demodulator 1.

When the quadrature demodulator 1 mixes the local signal Lo into an RF signal, offset voltages occur between the signals i and ix and between the signals q and qx. Even if these offset voltages are several mV, each of the receive baseband units 2 and 3 has a cascade gain of several tens dB, which can make difficult the normal reception because of the occurrence of circuit saturation in the control unit 4.

The offset compensating circuit 20 resides therein for the purpose of avoiding this problem. This offset compensating circuit 20 inputs the output signals I and Ix of the amplifier 25 to the low pass filter 24 to extract a DC voltage through the low pass filter 24. In addition, the offset compensating section 23 feedbacks voltages or currents corresponding to the inputted difference voltages (offset voltages) to an input section of the amplifier 25. This feedback loop operates to eliminate the DC voltage offsets between the signals I and Ix.

When the low pass filter 24 is included in this feedback loop, the closed loop thereof provides a high pass filter characteristic, with the cutoff frequency of the high pass filter lowering with an increase in the time constant of the low pass filter 24. Accordingly, in the output signal of the receive baseband unit 2, a signal component in the vicinity of the DC is cut off due to the effects of the high pass filter. That is, the receive error rate becomes high. The time constant of the low pass filter is set in consideration of the high pass filter characteristic.

FIG. 6 is a time chart corresponding to the above-described operations. In the illustration, CLOCK, DATA and STROBE signify a clock signal, a data signal and a strobe signal, respectively, with desired frequency data being set in the frequency synthesizer 6 on the basis of these signals, and Lo depicts a local signal outputted from the frequency synthesizer 6 and represents a state of variation in frequency of the output signal of the voltage control oscillator 61. The frequency of this local signal Lo stably becomes a desired frequency at THE time elapsed to some extent with respect to the STROBE, that is, at the time instructed by a lock signal (LOCK). Moreover, Vgc denotes a gain control signal outputted from the control unit 4 which controls the gain of the gain control amplifier 22 in accordance with a change of its level so that the output signals of the receive baseband units 2 and 3 reach predetermined levels, respectively. In this arrangement, assuming that the gain of the gain control amplifier 22 is increased in a state where the gain control signal Vgc is at a high voltage level, FIG. 6 shows a state in which the gain is stepwise increased when the received level is low.

In addition, in FIG. 6, I signifies a variation in DC level of a signal I with the passage of time. Properly, although an AC signal should be illustrated additionally therein, only the DC level is boldly shown for the purpose of the simplicity of explanation. A signal Ix has a waveform obtained by inverting the signal I upside down, and signals Q and Qx have waveforms similar to the signals I and Ix, respectively. When the gain control signal Vgc varies, the gain of the gain control amplifier 22 varies, so the DC level of the signal I varies instantaneously. Following this, the DC level of the signal I develops into one value at a response speed depending upon the time constant of the low pass filter 24.

In the above-described direct conversion receiver, when the signals I, Ix, Q and Qx vary in DC at the gain control of the gain control amplifier 22, a problem arises in that demodulation accuracy deteriorates. For this reason, the calculation of the received signal level is required to be done after the settlement of the DC variation, and the response time (the time taken until a gain control signal Vgc is set on the basis of the signal level calculated from the signals I, Ix, Q and Qx so that the variation in level of the signals I, Ix, Q and Qx comes to an end) of the automatic gain control (AGC) is limited by the response time of the offset compensating circuit 20. Accordingly, immediately after the frequency switching operation, an extremely long time is needed until the signals I, Ix, Q and Qx reach a predetermined AC level with the gain control being implemented by the automatic gain control.

In addition, in the case of the gain control for each receive slot during calls or the like, difficulty is encountered in avoiding the deterioration of the demodulation accuracy due to the DC variation.

Still additionally, since the increase in number of control signals to be outputted from the control unit 4 can be inhibited depending upon mobile radio equipment using this direct conversion receiver, there is a need to simplify the control section and the interface as much as possible.

Moreover, in a case in which this direct conversion receiver is employed for a mobile radio equipment such as a portable telephone, since the settlement of the automatic gain control during a queue operation takes time, there occurs a problem of prolonging the operation time of the receiver during the wait operation and shortening the wait time.

Still moreover, the call quality degrades due to the DC variation at the gain control in a call.

SUMMARY OF THE INVENTION

The present invention has been developed with a view to eliminating the above-mentioned problems, and it is therefore an object of the invention to provide a direct conversion receiver capable of shortening the time for the settlement of the automatic gain control at the wait operation and of preventing the degradation of the demodulation accuracy in a call, a mobile radio equipment using this direct conversion receiver, and an RF signal receiving method.

For this purpose, in accordance with the present invention, there is provided a direct conversion receiver comprising a quadrature demodulator for receiving an RF signal, obtained by quadrature modulation, to produce differential signals in a baseband by using a local signal from a frequency-switching type frequency synthesizer, a first low pass filter for conducting the band restriction on the differential signals, a gain control amplifier for amplifying or attenuating the differential signals, a second low pass filter for extracting a direct current component between the differential signals, obtained by amplification in another amplifier, an offset compensating unit for superimposing an offset voltage lowering signal on an input signal of the amplifier, and a control unit for outputting a gain control signal to the gain control amplifier to maintain constant a level of the amplified differential signal and for outputting data on a frequency of a local signal to be produced by the frequency synthesizer, wherein the second low pass filter includes a time constant circuit having one or more resistors and a capacitor for determining a time constant by a resistance of the resistor and a capacitance of the capacitor and a time constant changing means for changing the time constant of the time constant circuit to at least two values different in magnitude from each other, and the control unit includes a time constant control unit for controlling the time constant changing means so that the time constant of the time constant circuit assumes the smaller one for only a predetermined period of time after the control unit outputs data to change the frequency of the local signal.

With this arrangement, the gain control interval can be shortened by decreasing the time constant of the second low pass filter, thereby accomplishing fast settlement of the automatic gain control. Moreover, since the time constant of the second low pass filter is increased after the settlement of the automatic gain control, it is possible to lower the cutoff frequency of the high-pass characteristic of the received baseband unit, which results in reducing the receive error rate.

In this case, the time constant control unit is composed of a switch set to an off state for a period of time that the time constant of the second low pass filter is decreased and set to an on state for a period of time that the time constant of the second low pass filter is increased and having one end to which the gain control signal is applied from the control unit and a capacitor connected between the other end of the switch and the ground.

With this arrangement, since the variation of the gain control signal becomes gentle and the gain control can be implemented to permit the follow-up of the offset compensating unit, the DC level variation does not develop in a signal outputted from the receive baseband unit, thereby enhancing the demodulation accuracy.

In addition, preferably, the time constant control unit includes a counter activated at the input of data from the control unit to the frequency synthesizer for outputting a control signal for the control of the time constant of the second low pass filter and a control signal for the on/off control of the switch.

With this arrangement, since a system using a frequency synthesizer always employs the signals including the CLOCK, the DATA and the STROBE, there is no need to employ special control signals.

As another preferred arrangement, the time constant control unit includes a counter activated at the input of a sleep cancellation signal to the quadrature demodulator and the receive baseband unit for outputting a control signal for the control of the time constant of the second low pass filter and a control signal for the on/off control of the switch.

This arrangement enables coping with control units having various types of specifications.

Moreover, it is also appropriate that the frequency synthesizer includes a lock detecting circuit for making a decision on a locked condition, and a counter is provided which is activated when this lock detecting circuit detects the locked condition, for outputting a control signal for the control of the time constant of the second low pass filter and a control signal for the on/off control of the switch.

Since the time of the sleep cancellation to the quadrature demodulator or the receive baseband unit is a timing at which the output frequency of the frequency synthesizer becomes stable and a smaller pulse width of the signal for the control of the switch is employable, the reduction of the circuit scale of the counter is feasible.

In addition, there is provided a counter which is activated at the input of a sleep cancellation signal from the control unit to the frequency synthesizer or at the input of data to the frequency synthesizer for outputting the signals for the control of the time constant of the second low pass filter and the on/off control of the switch.

With this arrangement, while the frequency synthesizer conducts the frequency switching operation, the quadrature demodulator or the receive baseband unit is in the sleep condition, and this can shorten the operating time of the receiver which is in the wait operation.

Still additionally, this direct conversion receiver is provided in a mobile radio equipment.

Since this arrangement can shorten the time needed for the settlement of the automatic gain control during the wait operation, which shortening the operating time of the receiver which is in the wait operation and shortening the wait time. Moreover, because of no DC variation at the gain control during call, no deterioration of the call quality occurs.

BRIEF DESCRIPTION OF THE DRAWINGS

These and other objects and features of the present invention will become more readily apparent from the following detailed description of the preferred embodiment taken in conjunction with the accompanying drawings in which.

DESCRIPTION OF THE PREFERRED EMBODIMENTS

Figure 5:
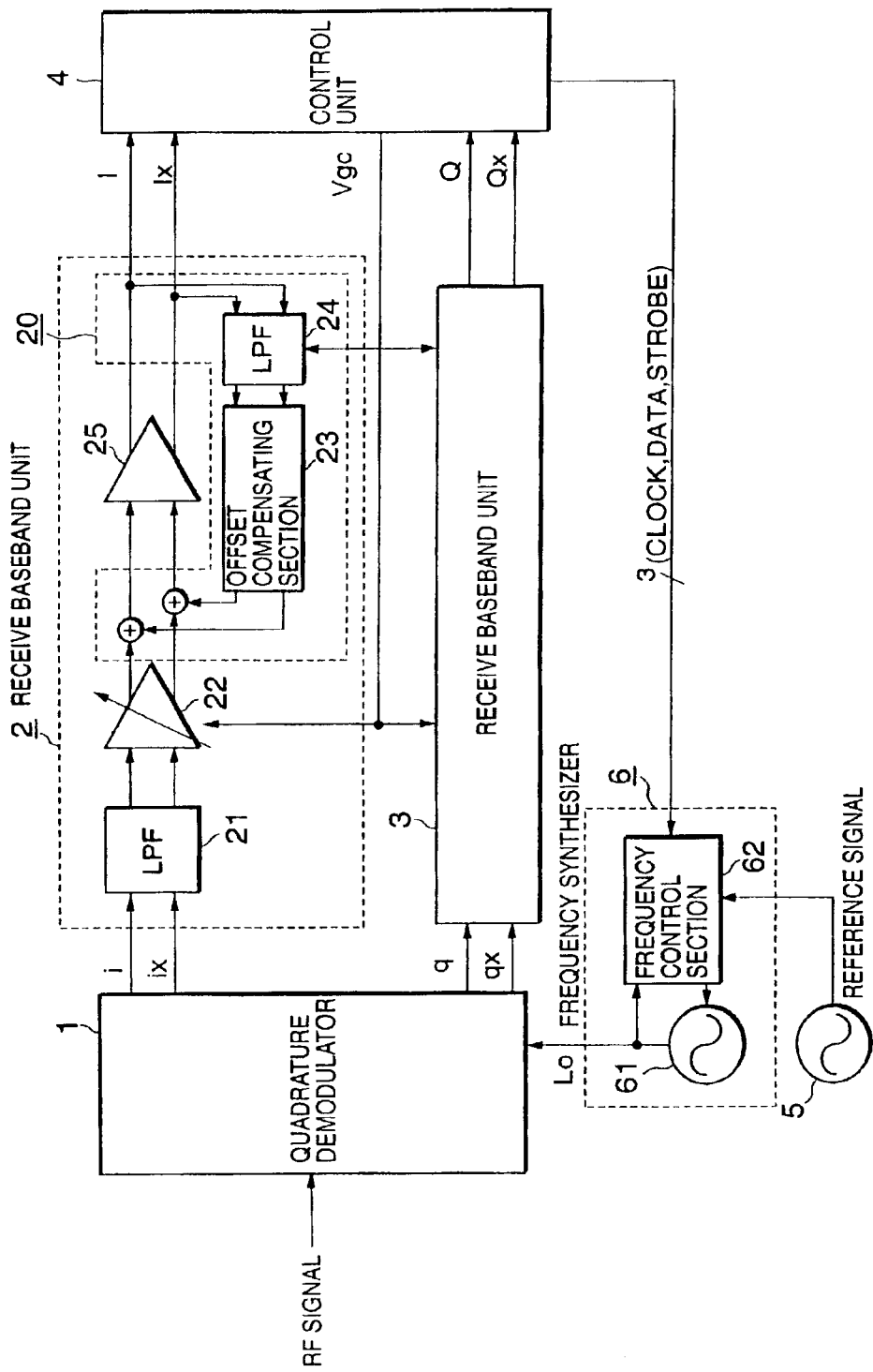
FIG. 5 is a block diagram showing a circuit arrangement of a conventional direct conversion receiver.
Figure 6:
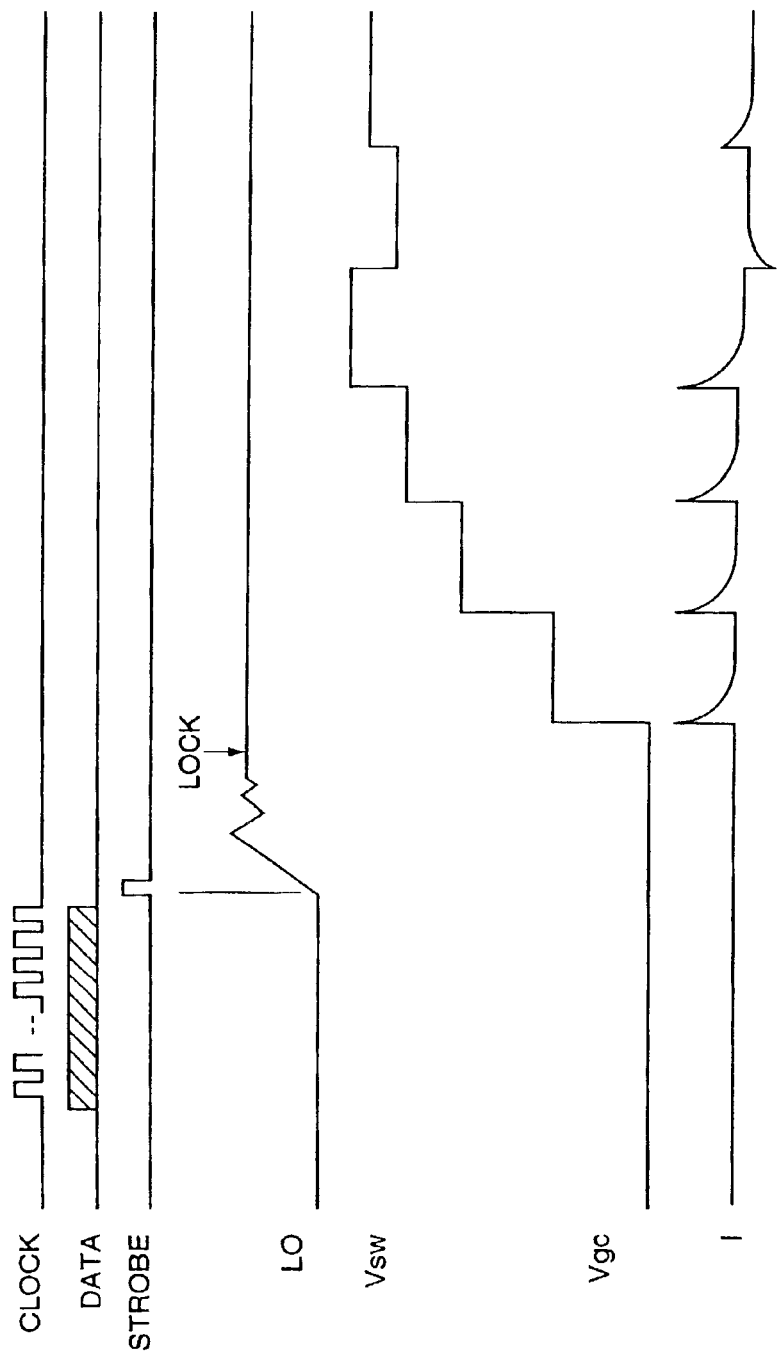
FIG. 6 is a time chart showing an operation of the conventional direct conversion receiver.

Referring to the drawings, a detailed description will be given hereinbelow of an embodiment of the present invention. Incidentally, the same parts as those of the conventional direct conversion receiver shown in FIG. 5 are marked with the same reference numerals, and the description thereof will be omitted for brevity.

Figure 1:
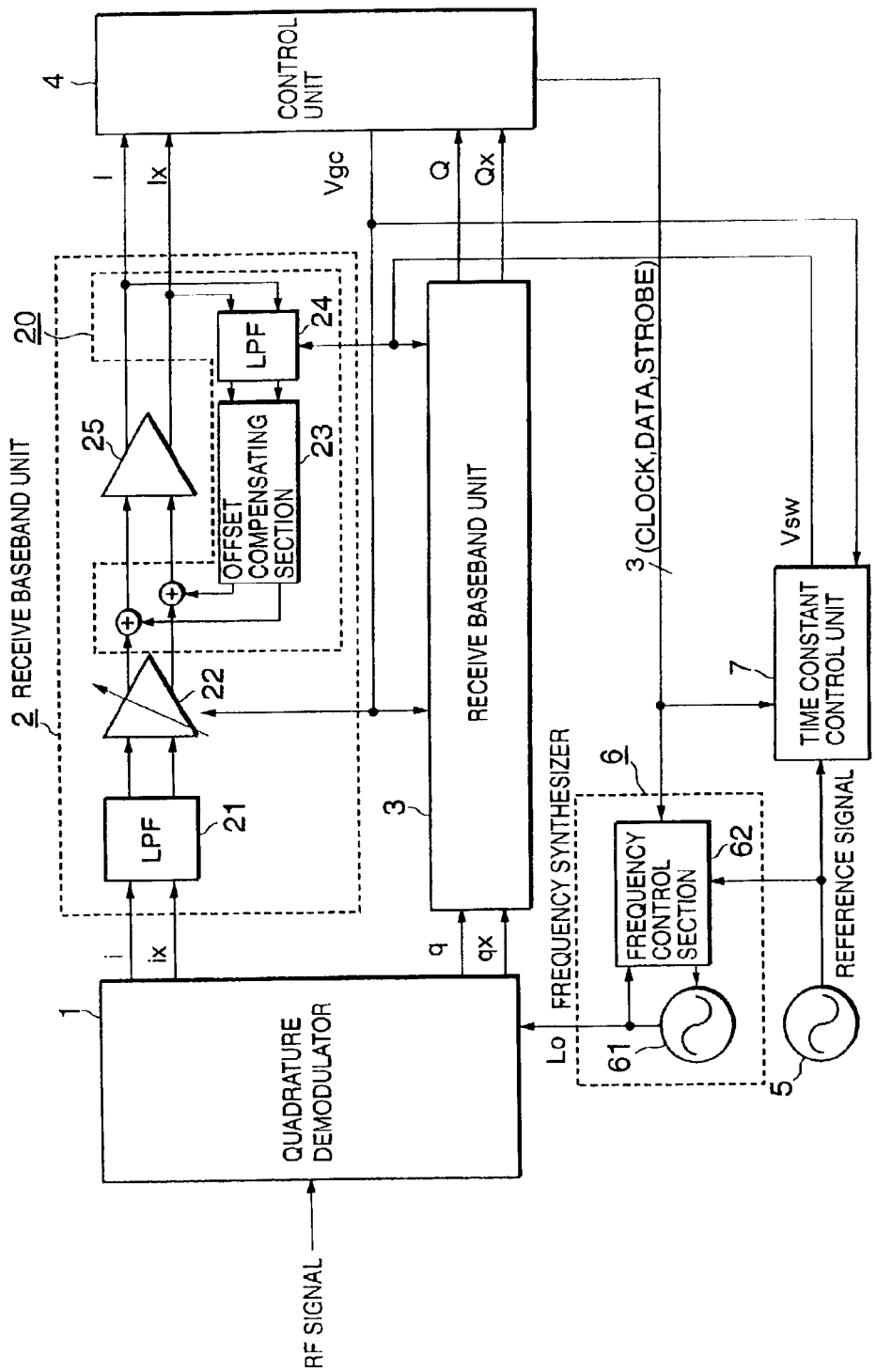
FIG. 1 is a block diagram showing a direct conversion receiver according to an embodiment of the present invention.

FIG. 1 is a block diagram showing a direct conversion receiver according to an embodiment of the present invention. As a feature of this direct conversion receiver different from the conventional direct conversion receiver shown in FIG. 5, a clock signal (CLOCK), a data signal (DATA), a strobe signal (STROBE) and a gain control signal Vgc are outputted from a control unit 4 to a time constant control unit 7 and a reference signal is outputted from a reference signal source 5 to the time constant control unit 7 while a signal Vsw is fed from the time constant control unit 7 to a low pass filter 24 constituting each of receive baseband units 2 and 3.

Figure 2:
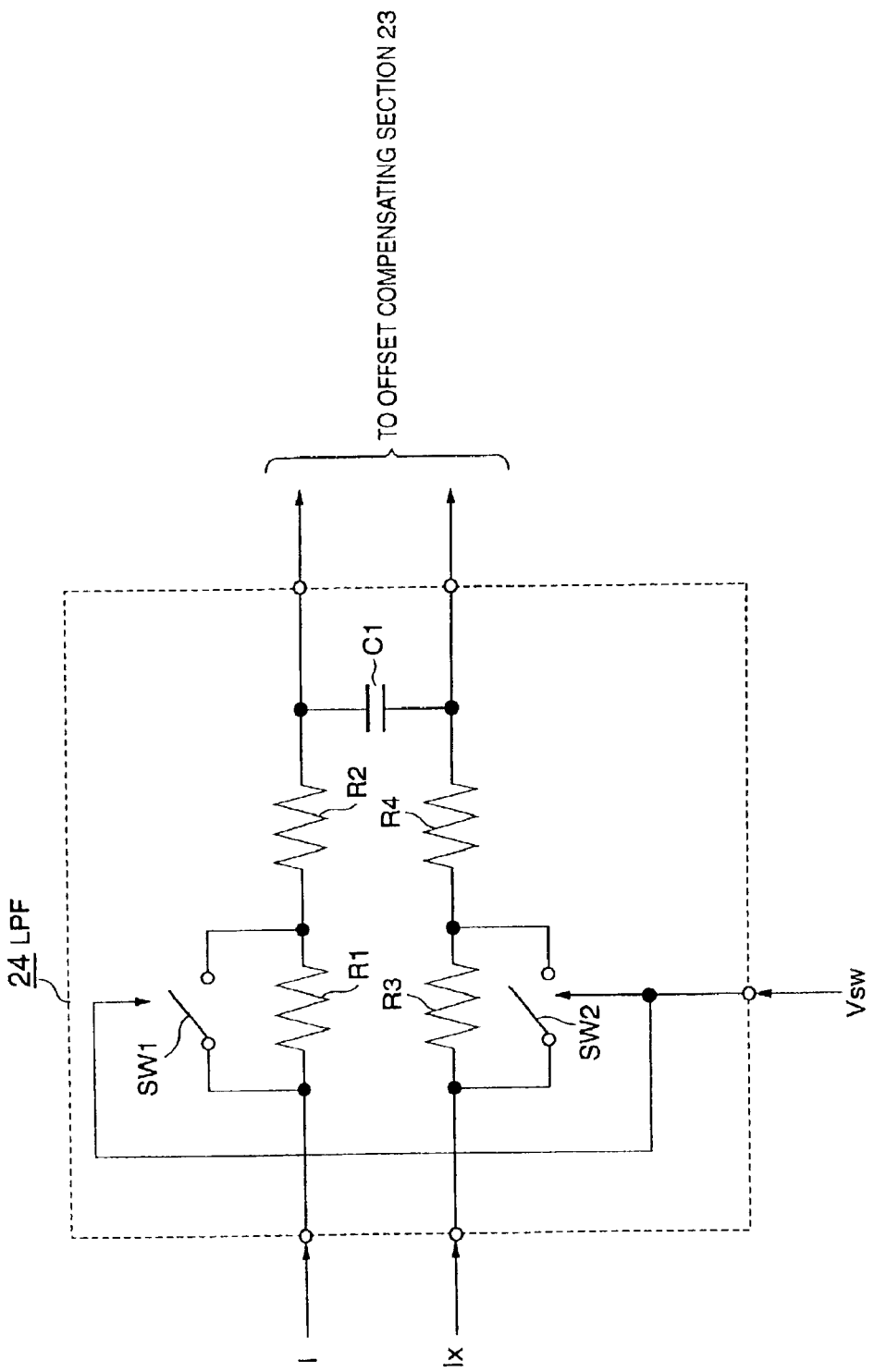
FIG. 2 is an illustration of a concrete circuit arrangement of a low pass filter in the embodiment of the invention.

FIG. 2 is an illustration of a concrete circuit arrangement of the low pass filter 24. This low pass filter 24 is made up of a resistor R1 whose one end is connected to an input terminal for a signal I, a resistor R2 whose one end is connected to the other end of the resistor R1 and whose other end is connected to a signal output terminal to an offset compensating section 23, a resistor R3 whose one end is connected to an input terminal for a signal Ix, a resistor R4 whose one end is connected to the other end of the resistor R3 and whose other end is connected to a signal output terminal to the offset compensating section 23, a capacitor C1 connected between the other ends of the resistors R2 and R4, a switch SW1 connected in parallel with the resistor R4, and a switch SW2 connected in parallel with the resistor R3, with the on/off control of each of the switches SW1 and SW2 being implemented in accordance with a signal Vsw. In this case, the resistors R1 and R2 have the same resistance value and the resistors R2 and R4 have the same resistance value, while the switches SW1 and SW2 are set to an on state when the signal Vsw is in an H (high) level and are set to an off state when it is in an L (low) level.

In this arrangement, when the signal Vsw assumes the H level, the switches SW1 and SW2 are operated to take the on state, which decreases the time constant of the low-pass filter 24, and when the signal Vsw assumes the L level, the switches SW1 and SW2 are operated to take the off state, thus increasing the time constant of the low pass filter 24.

Figure 3:
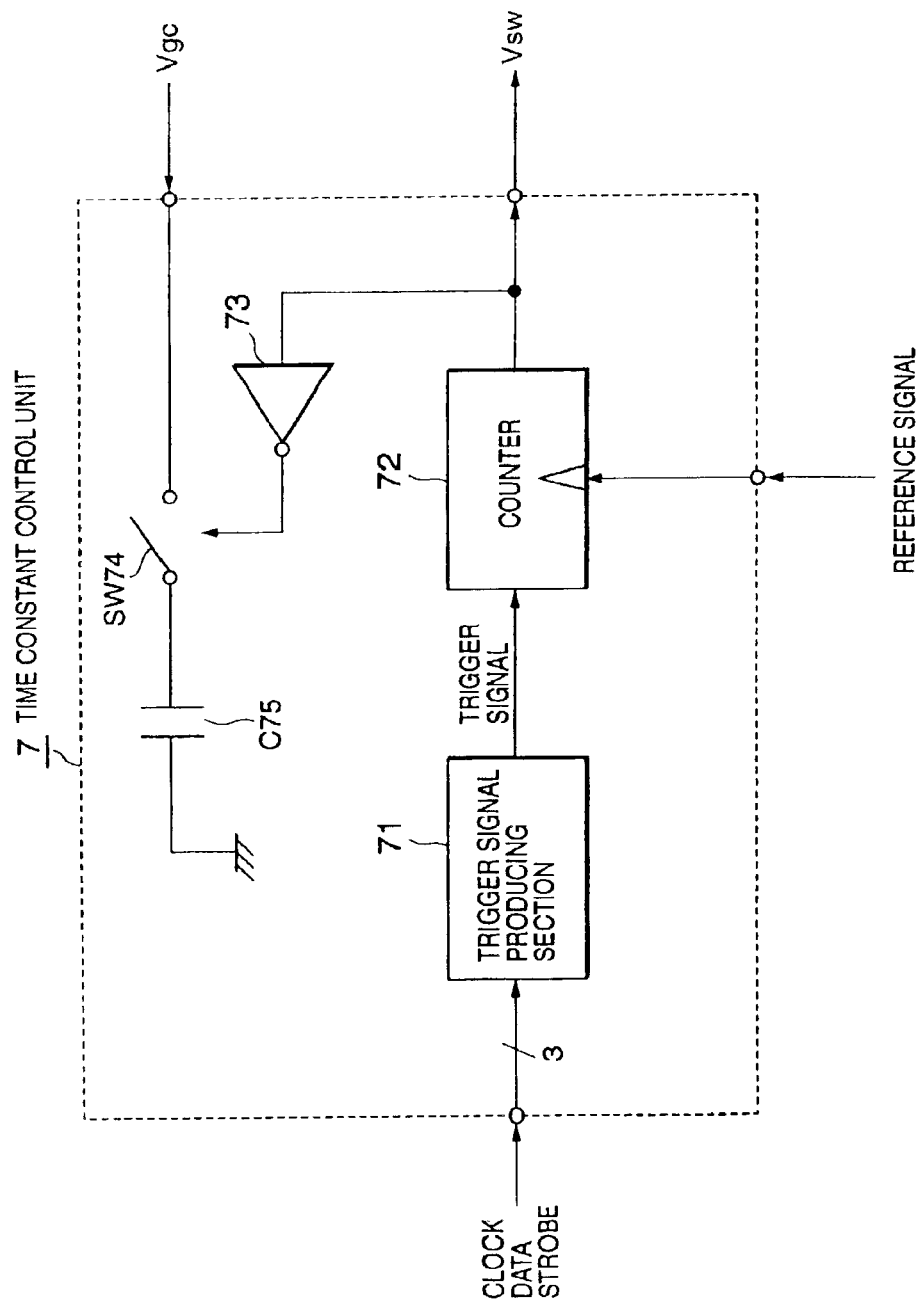
FIG. 3 is an illustration of a circuit arrangement of a time constant control unit in the embodiment of the invention.

FIG. 3 is a block diagram showing a circuit arrangement of the time constant control unit 7. This time constant control unit 7 is made to receive the CLOCK, DATA and STROBE, and is composed of a trigger signal producing section 71 for outputting a trigger signal, a counter 72 for counting reference signals as clocks in accordance with the trigger signal to output signal Vsw, an inverter 73 for receiving the signal Vsw to output it after inverting its level, a switch 74 con/off-controlled by the output of the inverter 73 and connected to an input terminal for the signal Vgc at its one end, and a capacitor C75 connected between the other end of the switch SW74 and the ground.

An operation of this time constant control unit 7 is as follows. When receiving CLOCK, DATA and STROBE as new frequency data, the trigger signal producing section 71 outputs a trigger signal for activating the counter 72. The counter 72 counts the reference signals until reaching a predetermined number, while outputting a signal Vsw with an H level during the counting operation. It outputs a signal Vsw with an L level at other times. The switch SW74 is set to an on state when the signal Vsw is in the H level while it is set to an off state in the L level condition. Accordingly, when the signal Vsw is in the L level, the capacitor 75 is coupled to the gain control signal Vgc and, hence, the gain control signal Vgc varies for a small time constant.

Figure 4:
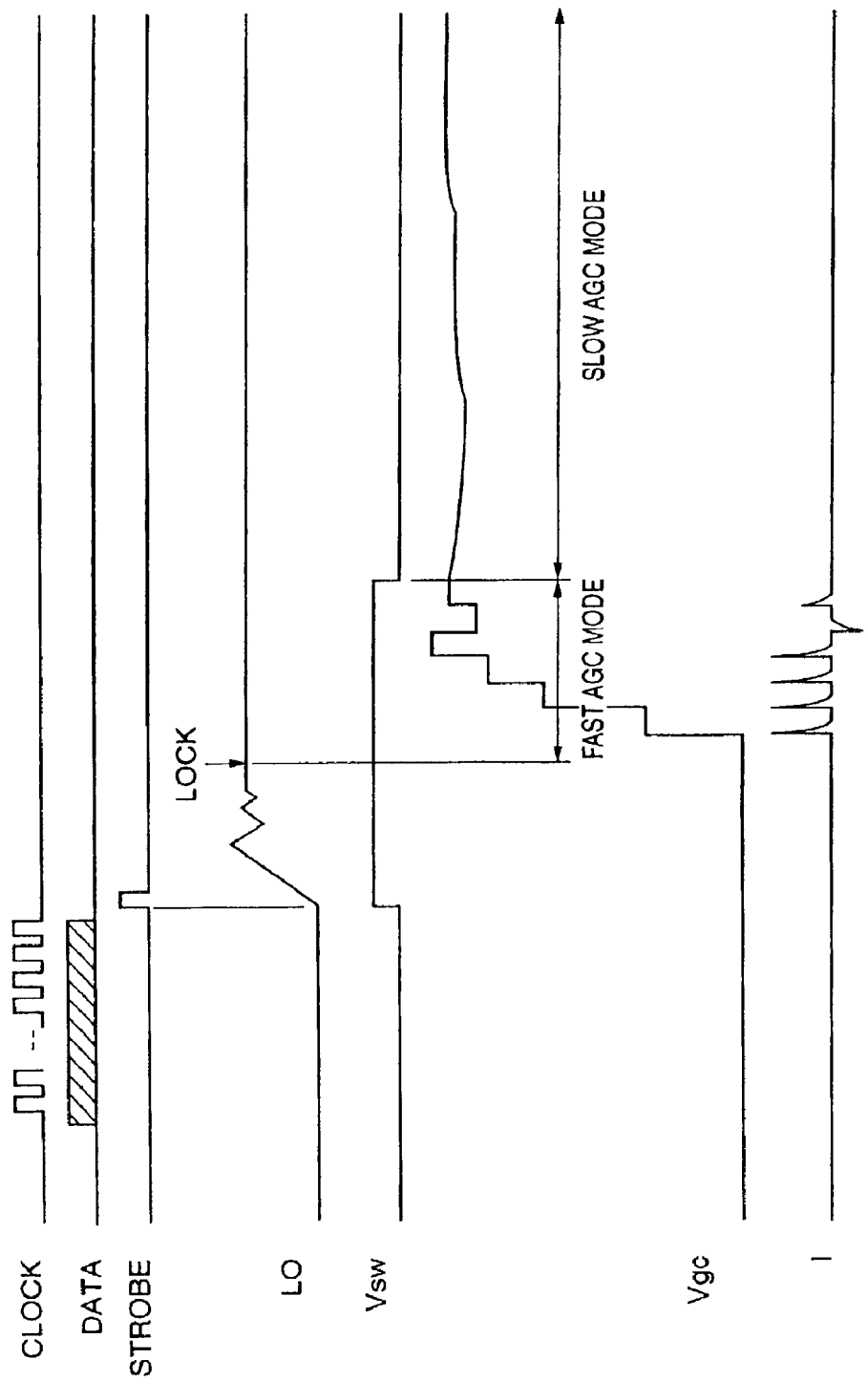
FIG. 4 is a time chart showing an operation of the direct conversion receiver according to the embodiment of the invention.

Secondly, referring to the timing chart of FIG. 4, a description will be given hereinbelow of the overall operation of the direct conversion receiver according to the present invention, particularly, the arrangements thereof different from those of the conventional apparatus.

First of all, the control unit 4 outputs CLOCK, DATA and STROBE to the frequency synthesizer 6 for setting desired frequency data. At this time, the trigger producing section 71 outputs a trigger signal to the counter 72 so that a signal Vsw assumes an H level. As a result, the switches SW1 and SW2 in the low pass filter 24 switch into the on state, thereby establishing a small time constant of the low pass filter 24.

Since the time constant of the low pass filter 24 is made small at the variation of the gain control signal Vgc, it is possible to quickly settle the DC variation appearing in the signals I, Ix, Q and Qx. Although the receive error rate increases when the time constant of the low pass filter 24 decreases, since only the calculation of the received signal level is made until the automatic gain control reaches the settlement, the extra reduction of low-frequency signal components of the receive baseband units 2 and 3 does not create a problem.

In this case, the control unit 4 shortens the gain control intervals (this will be referred to hereinafter as a "fast AGC mode) and settles the output signals of the receive baseband units 2 and 3 to a predetermined level.

When the counter 72 counts the reference signals by the predetermined number, the signal Vsw falls into the L level, thereby increasing the time constant of the low pass filter 24. The count value of the counter 72 sets the sum of the rise time (the time needed until settling at a desired frequency) plus the time for the fast AGC.

When the signal Vsw switches into the L level (this will be referred to hereinafter as a "slow AGC mode"), the time constant of the low pass filter 24 becomes high, thereby lowering the cutoff frequency of the above-mentioned high pass filter. That is, the receive error rate characteristic becomes improvable. Moreover, since the capacitor C75 operates with respect to the gain control signal Vgc, the gain control signal Vgc varies gently. If the time constant determined by the capacitor C75 is set to be longer than the response time of the offset compensating circuit 20, the offset is removable in accordance with the gentle variation of the gain control signal Vgc. That is, the DC level fluctuation does not occur in the signals I, Ix, Q and Qx.

In this connection, although in this embodiment each of the receive baseband units 2 and 3 is composed of the low pass filter 21, the gain control amplifier 22, the amplifier 25 and the offset compensating circuit 20, the present invention is not limited to this. Moreover, although the arrangement for switching the time constant is shown in FIG. 2, another arrangement is also acceptable if it can similarly change the time constant.

In this embodiment, the trigger signal is made to be produced from the CLOCK, DATA and STROBE inputted to the frequency synthesizer 6. This is because the CLOCK, DATA and STROBE are always used in a system employing a frequency synthesizer. That is, it is possible to eliminate the need for the employment of special control signals.

In addition, it is also appropriate that a trigger signal is produced using a sleep cancellation signal for the quadrature demodulator 1, the receive baseband units 2 and 3 or others. In this case, the timing of the sleep cancellation of the quadrature demodulator 1 or the receive baseband units 2 and 3 is a timing at which the output frequency of the frequency synthesizer 6 comes to a stable condition, and the pulse width of the signal Vsw can be made smaller so that the circuit scale of the aforesaid counter 72 is reducible. Still additionally, since the quadrature demodulator 1 or the receive baseband units 2 and 3 are in the sleep condition during the frequency switching operation of the frequency synthesizer 6, it is possible to shorten the operating time of the receiver in the wait operation.

Furthermore, usually, the frequency synthesizer 6 is equipped with a lock detecting circuit (not shown) which makes a decision as to whether in a locked condition or not and outputs a decision signal. Thus, it is also appropriate that a trigger signal is produced using a clock detection signal the lock detecting circuit outputs when making a decision to the locked condition. Also in this case, there is no need to add special signals to the control unit.

Still furthermore, in a case in which the frequency synthesizer 6 is independently equipped with an input terminal for a sleep cancellation signal, a trigger signal can also be produced from any one of the sleep cancellation signal, CLOCK, DATA and STROBE.

As described above, in the direct conversion receiver according to the present invention, the automatic gain control is divided into the fast AGC mode and the slow AGC mode, and in the fast AGC mode the automatic gain control interval can be shortened in order to decrease the time constant of the low pass filter 24 so that the automatic gain control quickly reaches the settlement.

On the other hand, in the slow AGC mode, the time constant of the low pass filter 24 is increased to lower the cutoff frequency of the high pass characteristic of the receive baseband units 2 and 3, thereby reducing the receive error rate.

In addition, in the slow AGC mode, the variation of the gain control signal Vgc is made gentle to control the gain while permitting the follow-up of the offset compensating section 23, so the DC level variation does not occur in a signal outputted from the receive baseband section.

Still additionally, in a case in which this direct conversion receiver is put in a mobile radio equipment such as portable telephone, it is possible to shorten the time needed for the settlement of the automatic gain control during the waiting operation, which prolongs the operating time of the receiver during the waiting operation and lengthens the wait time. Yet additionally, because of no DC variation at the gain control during a call, no deterioration of the call quality occurs.

As obvious from the above description, according to the present invention, in a direct conversion receiver for use in a mobile radio equipment or the like, the automatic gain control is divided into a fast AGC mode and a slow AGC mode, and in the fast AGC mode, the automatic gain control interval can be shortened for the decrease of the time constant of the second low pass filter so that fast automatic gain control settlement is feasible.

On the other hand, in the slow AGC mode, the cutoff frequency of the high pass characteristic of the receive baseband section to increase the time constant of the second low pass filter for the reduction of the receive error rate, and the variation of the automatic gain control signal is made gentle to accomplish the gain control while permitting the follow-up of the offset compensating section, which prevents the variation of the DC level from appearing in a signal outputted from the receive baseband section.

It should be understood that the present invention is not limited to the above-described embodiment, and that it is intended to cover all changes and modifications of the embodiment of the invention herein which do not constitute departures from the spirit and scope of the invention.

What is claimed is:

1. A direct conversion receiver comprising:
   a frequency synthesizer for producing a local signal which is switched in frequency;
   a quadrature demodulator for receiving an RF signal undergoing quadrature modulation to produce differential signals in a baseband by using said local signal from said frequency synthesizer;
   a first low pass filter for conducting a band restriction on said differential signals;
   a gain control amplifier for amplifying or attenuating said differential signals subjected to the band restriction;
   an amplifier for amplifying output signals of said gain control amplifier;
   a second low pass filter for extracting a direct current component between differential signals outputted from said amplifier;
   an offset compensating unit for superimposing a feedback signal, for reducing an offset voltage between said differential signals outputted from said amplifier, on input signals to said amplifier on the basis of outputs of said second low pass filter; and
   a control unit for receiving said differential signals outputted from said amplifier to output a gain control signal to said gain control amplifier for maintaining constant a level of said differential signals and for outputting data on a frequency of said local signal to be produced by said frequency synthesizer,
   said second low pass filter including a time constant circuit having one or more resistors and a capacitor for determining a time constant through the use of a resistance of said resistor and a capacitance of said capacitor and time constant changing means for changing the time constant of said time constant circuit to at least two values different in magnitude from each other, and said control unit including a time constant control unit for controlling said time constant changing means so that the time constant of said time constant circuit assumes the smaller one for a predetermined period of time after said control unit outputs data to change a frequency of said local signal.

2. The direct conversion receiver according to claim 1, wherein said time constant control unit is composed of a switch set to an off state for a period of time that a time constant of said second low pass filter is decreased and set to an on state for a period of time that the time constant of said second low pass filter is increased and having one end to which said gain control signal is applied from said control unit and a capacitor connected between the other end of said switch and the ground.

3. The direct conversion receiver according to claim 2, wherein said time constant control unit includes a counter activated in response to an input of data from said control unit to said frequency synthesizer for outputting a control signal for control of the time constant of said second low pass filter and a control signal for on/off control of said switch.

4. The direct conversion receiver according to claim 2, wherein said time constant control unit includes a counter activated in response to an input of a sleep cancellation signal to said quadrature demodulator and a receive baseband unit including said first low pass filter, said gain control amplifier, said amplifier, said second low pass filter and said offset compensating unit for outputting a control signal for control of the time constant of said second low pass filter and a control signal for the on/off control of said switch.

5. The direct conversion receiver according to claim 2, further comprising, in an arrangement of said frequency synthesizer including a lock detecting circuit for making a decision on a locked condition, a counter activated when said lock detecting circuit detects the locked condition, for outputting a control signal for control of the time constant of said second low pass filter and a control signal for the on/off control of said switch.

6. The direct conversion receiver according to claim 2, further comprising a counter activated in response to one of an input of a sleep cancellation signal from said control unit to said frequency synthesizer and an input of data therefrom to said frequency synthesizer for outputting a control signal for control of the time constant of said second low pass filter and a control signal for the on/off control of said switch.

7. A mobile radio equipment comprising a direct conversion receiver including:
   a frequency synthesizer for producing a local signal which is switched in frequency;
   a quadrature demodulator for receiving an RF signal undergoing quadrature modulation to produce differential signals in a baseband by using said local signal from said frequency synthesizer;
   a first low pass filter for conducting a band restriction on said differential signals;
   a gain control amplifier for amplifying or attenuating said differential signals subjected to the band restriction;
   an amplifier for amplifying output signals of said gain control amplifier;
   a second low pass filter for extracting a direct current component between differential signals outputted from said amplifier;
   an offset compensating unit for superimposing a feedback signal, for reducing an offset voltage between said differential signals outputted from said amplifier, on input signals to said amplifier on the basis of outputs of said second low pass filter; and
   a control unit for receiving said differential signals outputted from said amplifier to output a gain control signal to said gain control amplifier for maintaining constant a level of said differential signals and for outputting data on a frequency of said local signal to be produced by said frequency synthesizer,
   said second low pass filter having a time constant circuit having one or more resistors and a capacitor for determining a time constant through the use of a resistance of said resistor and a capacitance of said capacitor and time constant changing means for changing the time constant of said time constant circuit to at least two values different in magnitude from each other, and said control unit having a time constant control unit for controlling said time constant changing means so that the time constant of said time constant circuit assumes the smaller one for a predetermined period of time after said control unit outputs data to change a frequency of said local signal.

8. A method of receiving an RF signal, comprising:

a step of producing a local signal which is switched in frequency;

a step of receiving an RF signal undergoing quadrature modulation to produce differential signals in a baseband by using said local signal;

a step of conducting a band restriction on said differential signals;

a step of amplifying or attenuating said differential signals subjected to the band restriction;

a step of amplifying said differential signals amplified or attenuated;

a step of extracting a direct current component between the amplified differential signals;

a step of reducing an offset voltage between said differential signals on the basis of the extracted direct current component; and a step of maintaining constant a level of the amplified differential signals and of outputting data on a frequency of said local signal, said direct current component extracting step including:
a step of determining a time constant through the use of a resistance of one or more resistors and a capacitance of a capacitor and of changing the time constant to at least two values different in magnitude from each other; and
a step of controlling the time constant to the smaller one for a predetermined period of time after an instruction for a change of the frequency of said local signal.

9. A direct conversion receiver comprising:

a frequency synthesizer for producing a local signal which is switched in frequency;

a quadrature demodulator for receiving an RF signal undergoing quadrature modulation to produce differential signals in a baseband by using said local signal from said frequency synthesizer;

a first low pass filter for conducting a band restriction on said differential signals;

a gain control amplifier for amplifying or attenuating said differential signals subjected to the band restriction;

an amplifier for amplifying output signals of said gain control amplifier;

a second low pass filter for extracting a direct current component between differential signals outputted from said amplifier, said second low pass filter including a time constant circuit having one or more resistors and a capacitor for determining a time constant through the use of a resistance of said resistor and a capacitance of said capacitor and time constant changing means for changing the time constant of said time constant circuit to at least two values different in magnitude from each other;

an offset compensating unit for superimposing a feedback signal, for reducing an offset voltage between said differential signals outputted from said amplifier, on input signals to said amplifier on the basis of outputs of said second low pass filter;

a control unit for receiving said differential signals outputted from said amplifier to output a gain control signal to said gain control amplifier for maintaining constant a level of said differential signals and for outputting data on a frequency of said local signal to be produced by said frequency synthesizer; and a time constant control unit for receiving said gain control signal from said control unit to control the time constant of said time constant circuit of said second low pass filter by means of said time constant changing means through the use of said gain control signal therefrom.

10. The direct conversion receiver according to claim 9, wherein said time constant control unit includes a counter coupled to said frequency data signal from said control unit to said frequency synthesizer and a switch coupled to said gain control signal, said counter being activated in response to an input of said frequency data from said control unit and being made to operate said switch for outputting a control signal for the control of the time constant of said time constant circuit for a predetermined period of time after the input of said frequency data from said control unit so that the time constant of said time constant circuit assumes the smaller one of said two values while being made to output another control signal for the control of the time constant of the time constant circuit after the elapse of said predetermined period of time so that the time constant of said time constant circuit comes to the larger one.

* * * * *